(12) United States Patent
Hasz et al.

(10) Patent No.: US 11,734,247 B2
(45) Date of Patent: Aug. 22, 2023

(54) SYSTEM AND METHOD PROVIDING QUERY TOOL FOR ENTERPRISE RESOURCE DATA

(71) Applicant: HARTFORD FIRE INSURANCE COMPANY, Hartford, CT (US)

(72) Inventors: Scott Martin Hasz, Windsor, CT (US); Christopher F Hubbs, Wethersfield, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 17/225,592

(22) Filed: Apr. 8, 2021

(65) Prior Publication Data

US 2022/0327104 A1 Oct. 13, 2022

(51) Int. Cl.
*G06F 16/22* (2019.01)
*G06F 16/26* (2019.01)
*G06F 16/248* (2019.01)
*G06F 16/242* (2019.01)

(52) U.S. Cl.
CPC ........ *G06F 16/2282* (2019.01); *G06F 16/248* (2019.01); *G06F 16/2428* (2019.01); *G06F 16/26* (2019.01)

(58) Field of Classification Search
None
See application file for complete search history.

(56) References Cited

U.S. PATENT DOCUMENTS

| 7,991,672 B2 | 8/2011 | Crowder |
| 10,095,672 B2 | 10/2018 | Theis et al. |
| 2007/0055596 A1 | 3/2007 | Yankovich et al. |
| 2013/0339291 A1* | 12/2013 | Hasner ............ G06F 16/283 707/601 |
| 2015/0310075 A1* | 10/2015 | Mescal ............ G06F 16/252 707/805 |

(Continued)

OTHER PUBLICATIONS

Mehranfar, "Flexible and smart financial analysis based on industry type using artificial intelligence", 2018 (Year: 2018).*

(Continued)

*Primary Examiner* — Dawaune A Conyers
(74) *Attorney, Agent, or Firm* — Buckley, Maschoff & Talwalkar LLC

(57) ABSTRACT

An enterprise resource data store may contain electronic records, each electronic record representing an enterprise resource entry, and including, for each entry, an electronic record identifier and a set of enterprise values. A series query data store may contain electronic records, each electronic record representing a series query, and including, for each series query, an electronic record identifier and a set of pre-defined single query parameters. A back-end application computer server may receive, from a remote user device, a selected series query. The server may then retrieve, from the series query data store, information about a selected set of pre-defined single query parameters including comparison period data. In addition, the server may retrieve, from the enterprise resource data store, information about enterprise resource entries associated with the selected set and comparison period data. The server may then arrange to output an indication of step analysis results and analysis notes.

16 Claims, 16 Drawing Sheets

(56) References Cited

U.S. PATENT DOCUMENTS

| | | | | |
|---|---|---|---|---|
| 2015/0378987 | A1* | 12/2015 | Sekar | G06F 16/30 |
| | | | | 704/9 |
| 2019/0318102 | A1* | 10/2019 | Araya | H04L 9/0891 |
| 2020/0013122 | A1 | 1/2020 | Kmak et al. | |
| 2020/0410013 | A1 | 12/2020 | Orumchian et al. | |
| 2022/0084664 | A1* | 3/2022 | Ginsburg | G16H 15/00 |
| 2022/0329498 | A1* | 10/2022 | Chaturvedi | H04L 41/5009 |

OTHER PUBLICATIONS

Vena Solution—Financial Planning and Analysis (FP&A) Application, https://www.venasolutions.com/solutions/integrated-business-planning, 5 pp.

* cited by examiner

ANALYSIS NOTES ASSISTANT – Single Query

Inputs

Account | Core Earning | Category | Actual | Drill Method | Segment — 530

Segment | Commercial Lines | Year | 2020 | Notes Level | Summary

Submit 512 | Time | Qtr 3 | Vs | 2020 | Qtr 5 | Show Per Share | No

— 510    — 520

Analysis Notes ( Revise 562 )( Bullet 564 )

2020 Qtr 3 actual Commercial Lines Core Earnings of $300,000 increased $50,000 from 2019 reflecting a $60,000 increase in Middle and Large Commercial partially offset by $15,000 in Small Commercial.

560

Step Analysis ( Suppress 552 )    550

| | $K |
|---|---|
| Commercial Lines Core Earnings | |
| 2019 Qtr3 Actual | $300,000 |
| Increase or (Decrease) Due To | |
| • Middle and Large Commercial | $60,000 |
| ○ Global | $5,000 |
| • Small Commercial | ($15,000) |
| Total Increase or (Decrease) | $50,000 |
| 2020 Qtr3 Actual | $350,000 |

ANALYSIS NOTES ASSISTANT – Single Query

Inputs

Account: Core Earning | Category: Actual | Drill Method: Segment

Segment: Commercial Lines | Year: 2020 Vs 2020 | Notes Level: Summary

Submit | Time: Qtr 3 Qtr 6 | Show Per Share: No

Step Analysis — Suppress — 650

| Middle and Large Commercial Earnings | $K |
|---|---|
| 2019 Qtr3 Actual | $100,000 |
| Increase or (Decrease) Due To | |
| • National Accounts | $70,000 |
| • Marine | ($10,000) |
| ○ Pet Insurance | 0 |
| Total Increase or (Decrease) | $60,000 |
| 2020 Qtr3 Actual | $160,000 |

Analysis Notes — Revise — Bullet 664 — 690

2020 Qtr 3 Middle and Large Commercial of $160,... increased $60,000 from 2019.

+ $70,000 in National Accounts
- $10,000 in Marine

ANALYSIS NOTES ASSISTANT

ANALYSIS NOTES ASSISTANT – Single Query

Inputs

| | | | | | |
|---|---|---|---|---|---|
| Account | Core Earning | Category | Actual | Drill Method | Account ▽ |
| Segment | Commercial Lines | Year | 2020 Vs 2020 | Notes Level | Segment |
| | Submit 812 | Time | Qtr 3   Qtr 8 | Show Per Share | Combination — No |

— 830

Step Analysis ( Suppress )

| Middle and Large Commercial Earnings | $K |
|---|---|
| 2019 Qtr3 Actual | $100,000 |
| Increase or (Decrease) Due To | |
| • National Accounts | $70,000 |
| • Marine | ($10,000) |
| ○ Pet Insurance | 0 |
| Total Increase or (Decrease) | $60,000 |
| 2020 Qtr3 Actual | $160,000 |

Analysis Notes ( Revise ) ( Bullet )

2020 Qtr 3 Middle and Large Commercial of $160,000 increased $60,000 from 2019.

+ $70,000 in National Accounts
- $10,000 in Marine

*FIG. 8*

ANALYSIS NOTES ASSISTANT – Single Query

Inputs 910

| | | | | |
|---|---|---|---|---|
| Account | Total Exp System | Category | Actual | Drill Method | Segment |
| Exp Dept | | Year | 2020 Vs 2020 | Notes Level | Summary |
| Commodity | | Time | Qtr 3  Qtr 9 | Show Per Share | No |
| Segment | Middle and Large | | | Show Staff | Yes |

Submit 912 ...press

Step Analysis

| Middle and Large Commercial Earnings | $K |
|---|---|
| 2019 Qtr3 Actual | $100,000 |
| Increase or (Decrease) Due To | |
| • National Accounts | $70,000 |
| • Marine | ($10,000) |
| ○ Pet Insurance | 0 |
| Total Increase or (Decrease) | $90,000 |
| 2020 Qtr3 Actual | $190,000 |

Analysis Notes  ( Revise )  ( Bullet )

2020 Qtr 3 Middle and Large Commercial of $190,000 increased $90,000 from 2019.

+ $70,000 in National Accounts
- $10,000 in Marine

ANALYSIS NOTES ASSISTANT – Series Preferences

Cube Preference 1182 ▽

Thresholds 1110

Absolute dollar amount above which all support driver variances should be included in the notes. — 5,000 Dollars

Dollar Preference 1184 ▽

Percent of total support to be included in the notes, also used to derive the alternative amount > which all supporting drivers should be included. — 80%

Suppression 1120

Ratio Preference 1186 ▽

Dollar amount below which all supporting driver variances will be suppressed from step analysis when "Suppress" is active. — 0.500

Decimal Preference 1188 ▽

Ratio amount below which all supporting driver variances will be suppressed from step analysis when "Suppress" is active. — 0.10%

( Reset Defaults and Save 1192 )  ( Set Preferences 1194 )  ( Cancel 1196 )

SYSTEM AND METHOD PROVIDING QUERY TOOL FOR ENTERPRISE RESOURCE DATA

TECHNICAL FIELD

The present application generally relates to computer systems and more particularly to computer systems that are adapted to accurately and/or automatically provide an enterprise resource query tool for a spreadsheet application.

BACKGROUND

An enterprise, such as a business corporation, may have analysts review and summarize information. For example, an analyst might query one or more financial data stores and compare the results of a current time period with a similar time period in the past (e.g., comparing a current fiscal quarter's results with the same quarter last year). Moreover, the analyst might summarize the more relevant portions of the comparison for presentation to management, a board of directors, etc. If the results for a portion of a business are relatively unchanged from a prior period (e.g., only increasing or decreasing by a few percentage points), the analyst might omit the information from such a summary as being not that important. If the results are substantially different from the prior time period, however, the analyst might decide to include and/or highlight the increase or decrease to call attention to it in the summary. Note that the analyst might need to perform this task on a periodic basis (e.g., once per month) and incorporate his or her finding into various types of spreadsheets or presentations.

It can be difficult to manually and accurately review this type of information for an enterprise and generate a summary report or note. Moreover, it can be difficult and time consuming to format the results of the analysis again and again. It would therefore be desirable to provide systems and methods that accurately and/or automatically utilize an enterprise resource query tool to provide fast and reusable query results. Moreover, the results should be easy to access, understand, interpret, export, update, etc.

SUMMARY OF THE INVENTION

According to some embodiments, systems, methods, apparatus, computer program code and means are provided to accurately and/or automatically utilize an enterprise resource query tool that provides fast and reusable query results and that allow for flexibility and effectiveness when exporting those results.

Embodiments may be associated with a query tool system implemented via a back-end application computer server. An enterprise resource data store may contain electronic records, each electronic record representing an enterprise resource entry, and including, for each entry, an electronic record identifier and a set of enterprise values. A series query data store may contain electronic records, each electronic record representing a series query, and including, for each series query, an electronic record identifier and a set of pre-defined single query parameters. The back-end application computer server may receive, from a remote user device, a selected series query. The server may then retrieve, from the series query data store, information about a selected set of pre-defined single query parameters including comparison period data. In addition, the server may retrieve, from the enterprise resource data store, information about enterprise resource entries associated with the selected set and comparison period data. The server may then arrange to output an indication of step analysis results and analysis notes.

Some embodiments comprise: means for receiving, by a computer processor of a back-end application computer server from a remote user device, a selected series query; means for retrieving, from a series query data store, information about a selected set of pre-defined single query parameters including comparison period data, wherein the series query data store contains electronic records, each electronic record representing a series query, and including, for each series query, an electronic record identifier and a set of pre-defined single query parameters; means for retrieving, from an enterprise resource data store, information about enterprise resource entries associated with the selected set of pre-defined single query parameters and comparison period data, wherein the enterprise resource data store contains electronic records, each electronic record representing an enterprise resource entry, and including, for each entry, an electronic record identifier and a set of enterprise values; and means for arranging to output an indication of step analysis results and analysis notes to support interactive user interface displays via a distributed communication network.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to accurately and/or automatically utilize an enterprise resource query tool that provides fast and reusable query results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a single query results display according to some embodiments.

FIG. 6 illustrates bullet points in accordance with some embodiments.

FIG. 8 illustrates a drill method selection in accordance with some embodiments.

FIG. 9 is another single query results display according to some embodiments.

FIG. 10 is a user preferences display in accordance with some embodiments.

FIG. 11 is series preferences display according to some embodiments.

FIGS. 12A and 12B are associated with a series query in accordance with some embodiments.

DETAILED DESCRIPTION

Figure 1:
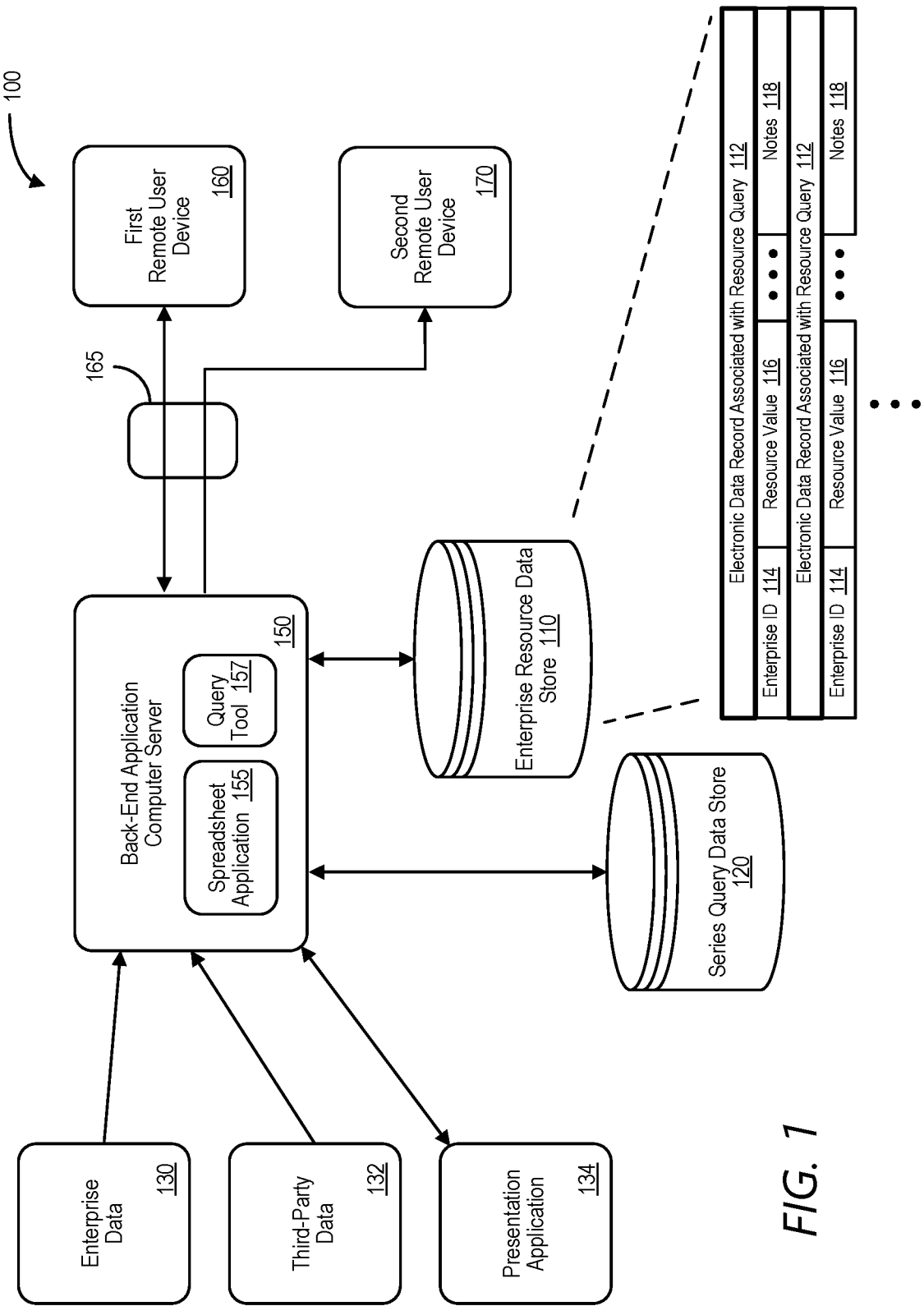
FIG. 1 is a high-level block diagram of a query tool system in accordance with some embodiments.

Before the various exemplary embodiments are described in further detail, it is to be understood that the present invention is not limited to the particular embodiments described. It is also to be understood that the terminology used herein is for the purpose of describing particular embodiments only, and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate financial analytics associated with an enterprise. The present invention is directed to more than merely a computer implementation of a routine or conventional activity previously known in the industry as it provides a specific advancement in the area of electronic record analysis by providing improvements in data leveraging to identify financial comparison results, summarize the effect of these results, and present the information in a way to facilitate strategies to improve outcomes. The present invention provides improvement beyond a mere generic computer implementation as it involves the novel ordered combination of system elements and processes to provide improvements in data leveraging to provide a query tool. Some embodiments of the present invention are directed to a system adapted to automatically analyze enterprise data, compare sets of data, automatically filter or suppress information, automatically format information that is exported from the system, and/or automatically generate a series of queries. Moreover, communication links and messages may be automatically established, aggregated, formatted, etc. to improve network performance (e.g., by reducing an amount of network messaging required to generate a report).

FIG. 1 is a high-level block diagram of a query tool system 100 according to some embodiments of the present invention. In particular, the system 100 includes a back-end application computer 150 server that may access information in an enterprise resource data store 110 (e.g., storing a set of electronic records associated with a resource query 112, an enterprise identifier 114, a resource value 116, notes 118, etc.). The back-end application computer server 150 may also retrieve information from other data stores or sources, such as a series query data store 120 and utilize a spreadsheet application 155 and query tool 157 to view, analyze, and/or summarize the electronic records. The spreadsheet application 155 might be associated with, for example, the EXCEL® spreadsheet application available from MICROSOFT®. In some embodiments, the query tool 157 is accessed via a "Financial Tools" plug-in or menu bar selection of the spreadsheet application 155. The back-end application computer server 150 may also exchange information with a first remote user device 160 and a second remote user device 170 (e.g., via firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to generate reports) and/or the remote user devices 160, 170. For example, the first remote user device 160 may transmit annotated and/or updated information to the back-end application computer server 150. Based on the updated information, the back-end application computer server 150 may adjust data in the enterprise resource data store 110 and/or the series query data store 120 and the change may be viewable via the second remote user device 170. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the enterprise resource data store 110 and/or series query data store 120. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the enterprise resource data store 110 and/or the series query data store 120. The data stores 110, 120 may be locally stored or reside remote from the back-end application computer server 150. As will be described further below, the enterprise resource data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and enterprise resource data store 110 might be co-located and/or may comprise a single apparatus.

The back-end application computer server 150 may analyze information from enterprise data 130 (e.g., storing spreadsheet and presentation files, additional final information, etc.), third-party data 132 (e.g., to supplement financial information), and/or a presentation application 134. The presentation application 134 might be associated with, for example, the POWERPOINT® presentation application available from MICROSOFT®.

Figure 2:
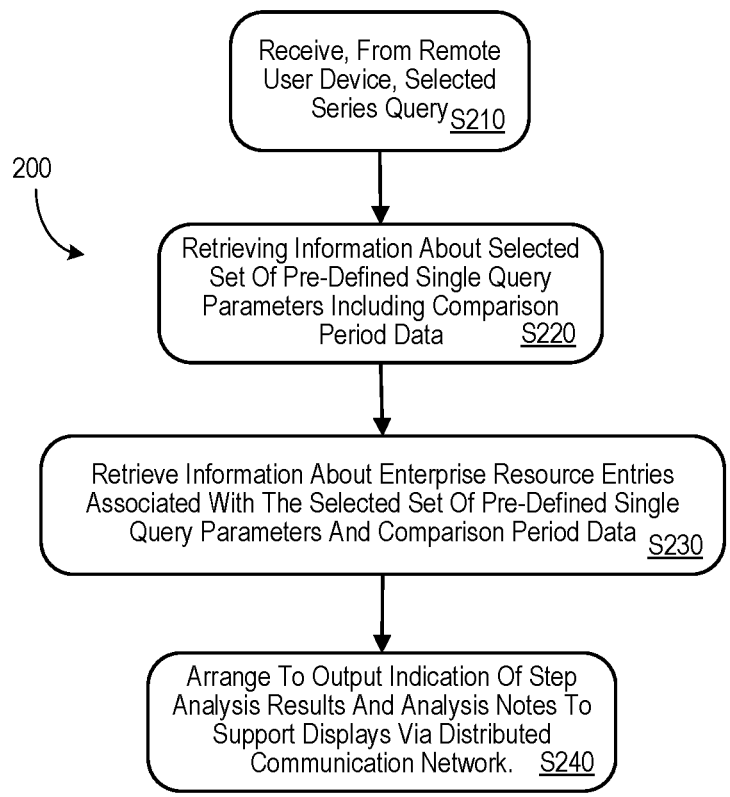
FIG. 2 illustrates a query tool method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of a back-end application computer server may receive, from a remote user device, a selected series query.

At S220, the system may retrieve, from a series query data store, information about a selected set of pre-defined single query parameters including comparison period data. The series query data store may, for example, contain electronic records, each electronic record representing a series query, and including, for each series query, an electronic record identifier and a set of pre-defined single query parameters. As used herein, the phrase "comparison period data" might refer to a first category, year, and time (e.g., fiscal quarter or calendar month) and a second category, year, and time. In some embodiments, the set of pre-defined single query parameters include an account input, a segment input, a commodity input, etc. The set of pre-defined single query parameters might also include, for example, a drill method, a note level, a show per share option, a show staff option, etc.

At S230, the system may retrieve, from an enterprise resource data store, information about enterprise resource entries associated with the selected set of pre-defined single query parameters and comparison period data. The enterprise resource data store may contain, for example, electronic records, each electronic record representing an enterprise resource entry, and including, for each entry, an electronic record identifier and a set of enterprise values.

At S240, the system may arrange to output an indication of step analysis results and analysis notes to support interactive user interface displays via a distributed communication network. Note that the step analysis results may automatically suppress immaterial items. According to some embodiments, an analyst can use a remote user device to override suppressed items. The step analysis or analysis notes may be exported, for example, to a spreadsheet application (e.g., or related file) and/or a presentation application (e.g., or a related file). In some embodiments, the step analysis or analysis notes may be exported to a particular file, application location (e.g., a page or slide name or number), and/or layout. Moreover, user preferences may define default inputs, cube preference, dollar preference, ratio preference, decimal preference, etc. associated with a step analysis or analysis notes. Similarly, series preferences might define cube preference, dollar preference, ratio preference, decimal preference, thresholds (e.g., dollar amount or percentages), and suppression rules.

Figure 3:
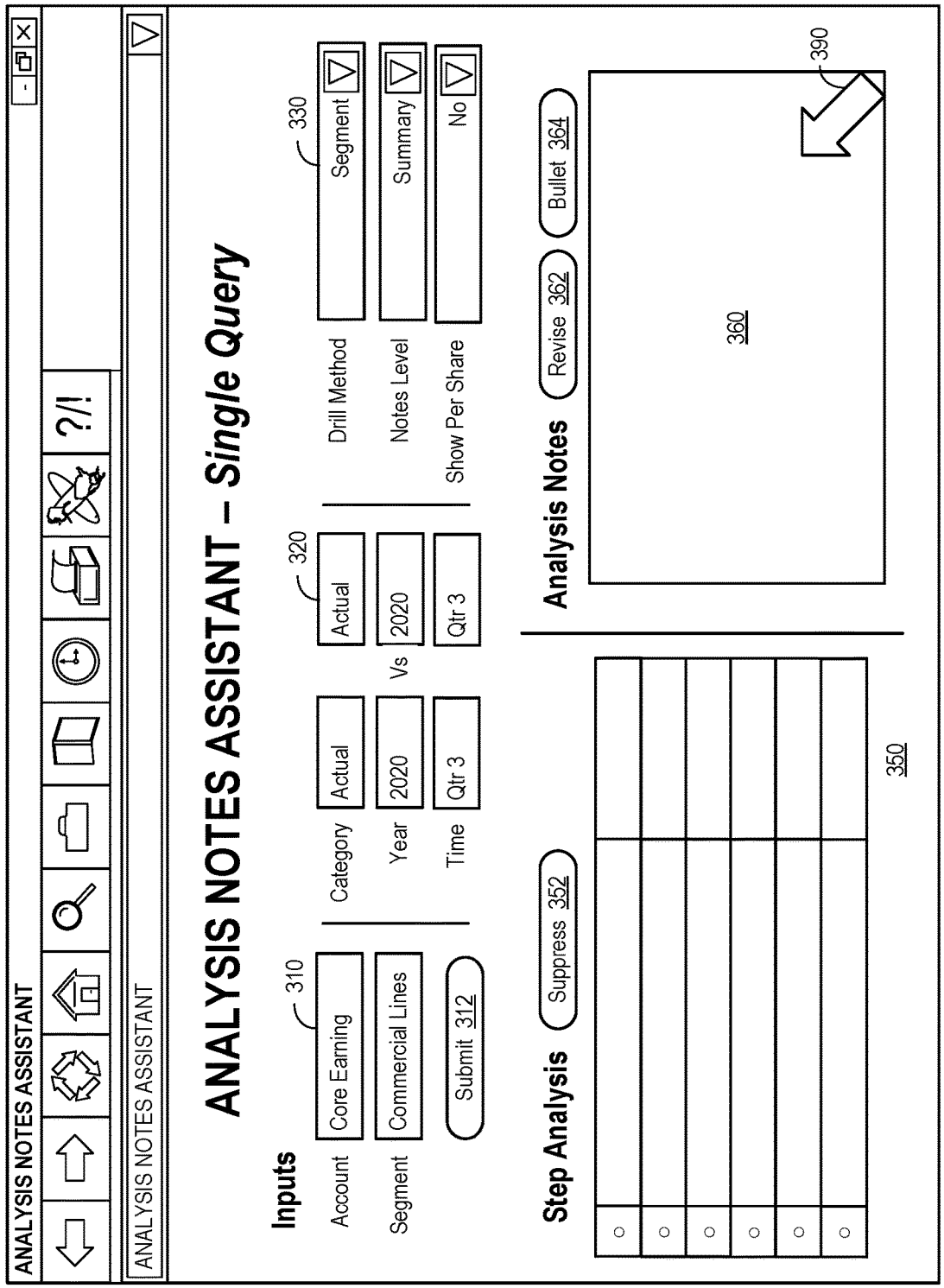
FIG. 3 is an analysis notes display for a single query according to some embodiments.
Figure 4:
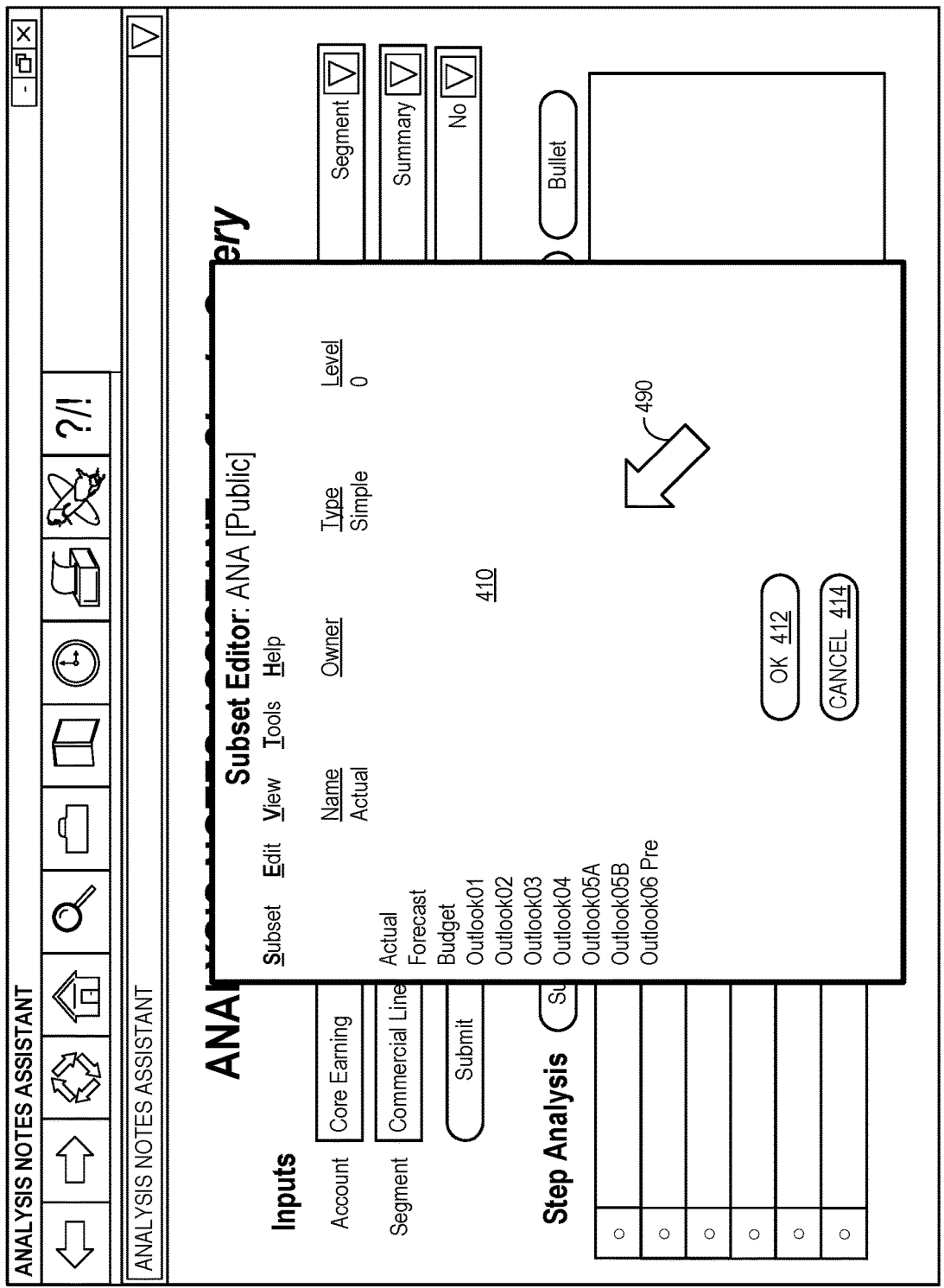
FIG. 4 is a subset editor display in accordance with some embodiments.

The query data to be analyzed by the system may be entered via a Graphical User Interface ("GUI"). For example, FIG. 3 is a query tool display 300 for a single query according to some embodiments. The query inputs may identify a portion of the enterprise 310 (e.g., an account and a segment). Moreover, the query inputs may further include comparison time period data 320 (e.g., a category, year, and time). For example, FIG. 4 is a subset editor display 400 in accordance with some embodiments that might be used to select 410 financial information to be compared by the query via an OK icon 412, cancel icon 414, and/or a pointer 490.

Referring again to FIG. 3, the query inputs may further include analysis notes assistant details 330, such as a drill method, notes level selection, and show per share selection. A step analysis area 350 may later include query results and a suppress icon 352 may be used to hide immaterial items. An analysis notes area 360 may later include query results that can be annotated via a revise icon 362 and/or reformatted via a bullet selection icon 364. Selection of a portion or element of the display 300 might result in the presentation of additional information about that portion or element (e.g., a popup window presenting more detailed data underlying that element) or let an operator or analyst enter or annotate additional information about an enterprise (e.g., in the analysis notes area 360 based on his or her experience and expertise).

Selection of the submit icon 312 (e.g., by touchscreen or computer pointer 390) might cause the system or platform to create a query result. For example, FIG. 5 is a single query results display 500 according to some embodiments. As before, query inputs may identify a portion of the enterprise 510 (e.g., an account and a segment). Moreover, the query inputs may further include comparison time period data 520 (e.g., a category, year, and time) and analysis notes assistant details 530, such as a drill method, notes level selection, and show per share selection. A step analysis area 550 now includes lines of query results and a suppress icon 552 may be used to hide immaterial items (as indicated by selection marks next to each line entry that can, in some embodiments, by overridden by the analyst). Selection of the submit icon 512 (e.g., by touchscreen or computer pointer 590) might cause the system or platform to re-generate a query result.

In addition, an analysis notes area 560 now includes text-based query results that can be annotated via a revise icon 562 and/or reformatted via a bullet selection icon 564. According to some embodiments, the analysis note area 560 uses Natural Language Processing ("NLP"), rules, and/or logic to create appropriate text for a query result. For example, certain query inputs might result in the use of the word "increased" (or "decreased") to be associated with a positive (or negative) financial value while other query inputs instead result in the use of the word "improved" (or "worsened"). As other examples, some inputs might result in certain words being capitalized, appear in bold or underline text, utilize synonyms ("budget" or "plan"), etc. According to some embodiments, custom spreadsheet application code and/or data store attributes may be used to implement these types of rules or logic. Note that an analyst may still be able to manually change the actual text that appears in the analysis notes area 560 (e.g., via the revise icon 562).

Moreover, selection of a result line in the step analysis area 550 via the computer pointer 590 may cause the display to "drill down" into financial details about that particular line. For example, FIG. 6 illustrates a result drill down display 600 after the "Middle and Large Commercial" result line in the step analysis area 650 was selected. Details about why that line increased by $60,000 are included in the step analysis area 650 and reflected in the text-based analysis notes area 660. Selection of the bullet icon 664 via computer pointer 690 has reformatted the text (as compared to the paragraph style of FIG. 5).

Figure 7:
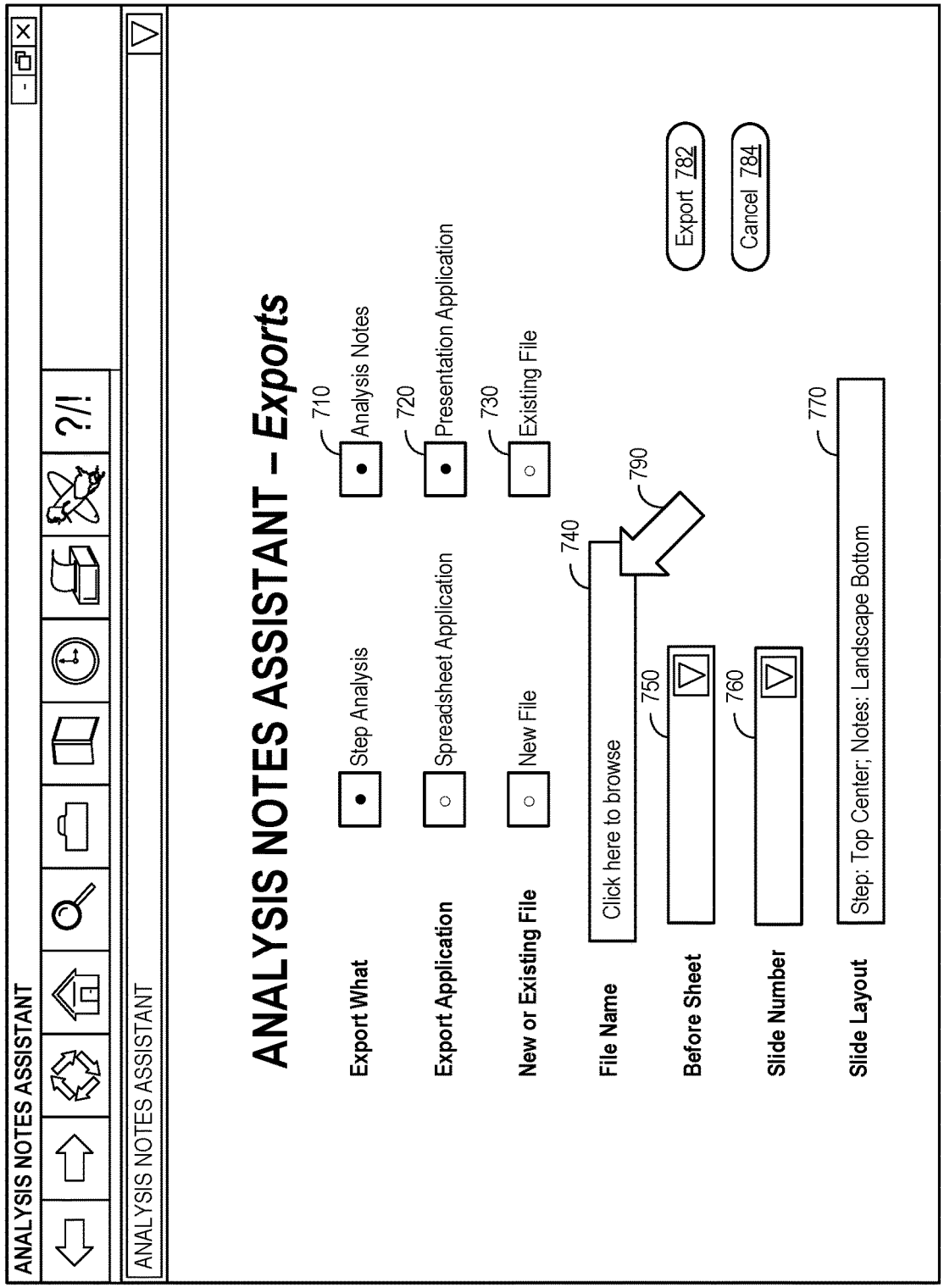
FIG. 7 is an analysis notes assistant export display according to some embodiments.

The results of a query may be exported in a number of different ways. For example, FIG. 7 is an analysis notes assistant export display 700 according to some embodiments. The display 700 lets an analyst define what information is being exported 710 (e.g., step analysis and/or analysis notes), an application to which the information is exported 720 (e.g., a spreadsheet application and/or presentation application). The information may be exported to a new or existing file 730 which can be defined 740 via the display 700. In addition, the analyst may define where in the file the information is inserted (e.g., a particular sheet 750 or slide number 760). According to some embodiments, a slide layout 770 may be specified to define how the information will be presented on a page. A computer pointer 790 may be used to select an export icon 782 or a cancel icon 784.

According to some embodiments, various drill down methods may be provided for the analysis notes assistant. For example, FIG. 8 illustrates a drill method selection 800 in accordance with some embodiments. Here, the analyst might select 830 an "account" level drill down option, a "segment" level drill down option, or a "combination" level drill down option. Note that various types of query parameters may require different input parameters 910 as illustrated by the display 900 of FIG. 9. Here, the input parameters 910 include an account, an "exp department," a commodity, and a segment along with a "show staff" decision. Selection of a submit icon 912 will result in the display being updated.

Figure 10:
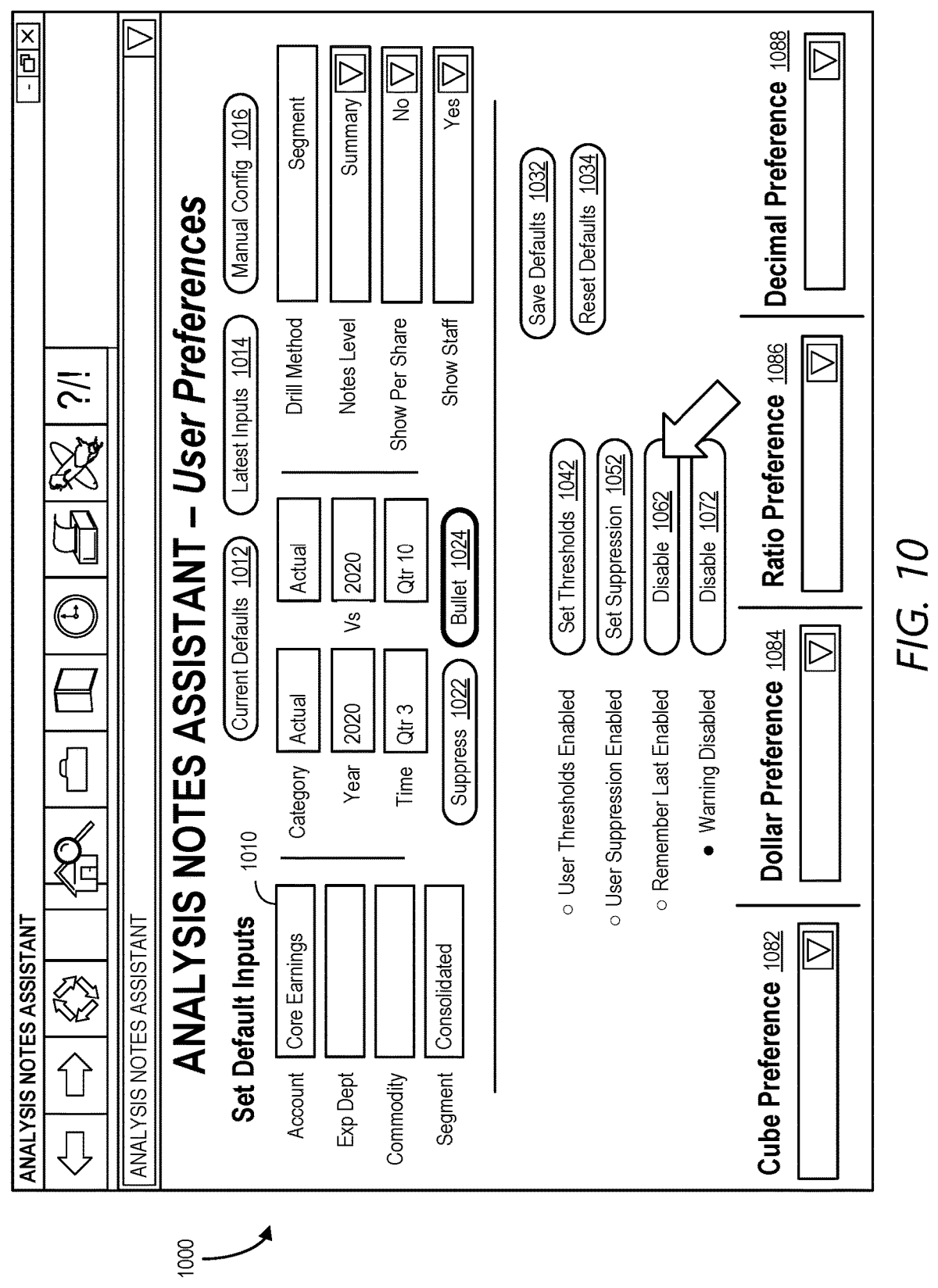

According to some embodiments, a user may enter pre-defined preferences about how information is collected and/or displayed in query result. For example, FIG. 10 is a user preferences display in 1000 accordance with some embodiments. The user may decide to enter preferences via a current default values icon 1012 (defining, for example, suppression icon 1022 and bullet icon 1024 preferences for the displayed inputs 1010), a latest set of inputs icon 1014, or a manual configuration icon 1016. Selection of the manual configuration icon 1016 lets the analyst make changes to his or current default inputs (e.g., by clicking a save defaults icon to store these as the default inputs for future analysis notes assistant sessions).

The analyst may choose a save defaults icon 1032 to set the choices above as the default choices when the analysis notes assistant opens. Choosing a reset default icon 1034 will revert the analysis notes assistant back to the "out-of-the-box" default inputs. Clicking a set thresholds icon 1042 will let the analyst override the default threshold values used to determine what drivers are included in the notes. Clicking the set suppression icon 1052 will allow let the analyst set a value for what is considered "immaterial" in the step analysis (and override the default setting). Selecting or deselecting the remember last enabled icon 1062 will save the configuration when choosing analysis notes assistant and restore those inputs the next time analysis notes assistant is launched. Selecting or deselecting the disable the login warning icon 1072 will prevent a server login warning box from popping up when launching analysis notes assistant.

Cube preference 1082 may be used to save a preferred primary cube (e.g., where enterprise financial information is stored) for pulling data when available. Dollar preference 1084 may be used to indicate what denomination should be presented for amounts. Ratio preference 1086 may be used to indicate whether ratios will be presented in percentages or points. Decimal preference 1088 may be used to indicate how many decimal places will be shown in the analysis notes assistant.

In addition to user preferences, FIG. 11 is series preferences display 1100 according to some embodiments. Cube preference 1182 may be used to save a preferred primary cube for pulling data when available. Setting dollar preference 1184 may be used to save a preferred dollar denomination display type for accounts. Setting ratio preference 1186 may be used to save a preferred ratio style display type. Setting decimal preference 1188 may be used to save a preferred ratio style display type (and might include dollar decimal places, ratio decimal places, and/or percentage decimal places).

Threshold settings 1110 may be used to determine what supporting and offsetting variance drivers are included in the notes. Supporting drivers may be additive to the net total variance being analyzed while offsets reduce the net total variance. Examples of threshold settings 1110 include: an absolute dollar amount above which all supporting driver variances should be included in the notes; a percent of total support to be included in the notes (also used to derive the alternative amount above which all supporting drivers should be included); an absolute dollar amount above which all offsetting driver variances should be included in the notes; and a percent of total offsets to derive the alternative amount above which all offsetting drivers should be included in the notes. Still other examples of threshold settings 1110 may include an absolute percent of variance allowed to be unexplained in the notes; an absolute dollar value of variance allowed to be unexplained in the notes; an absolute minimum dollar amount driver variances that must exceed to be included in the notes; a ratio threshold (the amount at or above which items will be included in the note); a percent threshold (the amount at or above which items will be included in the note); a policy count threshold (the amount at or above which items will be included in the note); and a staff count threshold the amount at or above which items will be included in the note).

Suppression settings 1120 may be used to determine a threshold for which variance drivers are considered immaterial and will be suppressed through a suppress immaterial items icon. The suppression settings may include: a dollar amount below which all supporting driver variances will be suppressed from the step analysis when suppressed is active; a ratio amount below which all supporting driver variances will be suppressed from the step analysis when suppressed is active; and a percentage amount below which all supporting driver variances will be suppressed from the step analysis when suppressed is active. Once the display 1100 is updated, the analyst might select a reset defaults and save icon 1192, a set preferences icon 1194, and/or a cancel icon 1196.

Figure 12A:
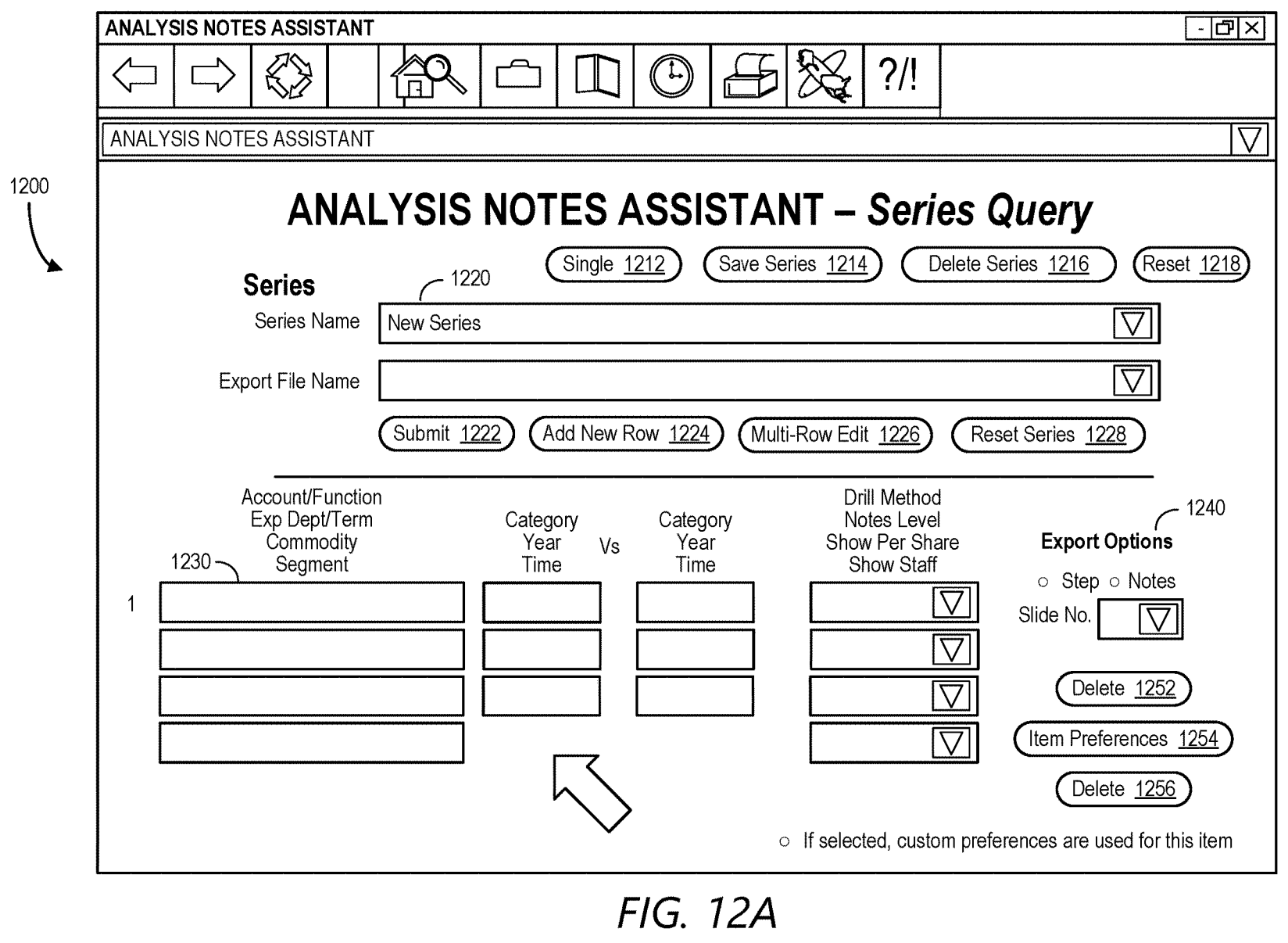
Figure 12B:
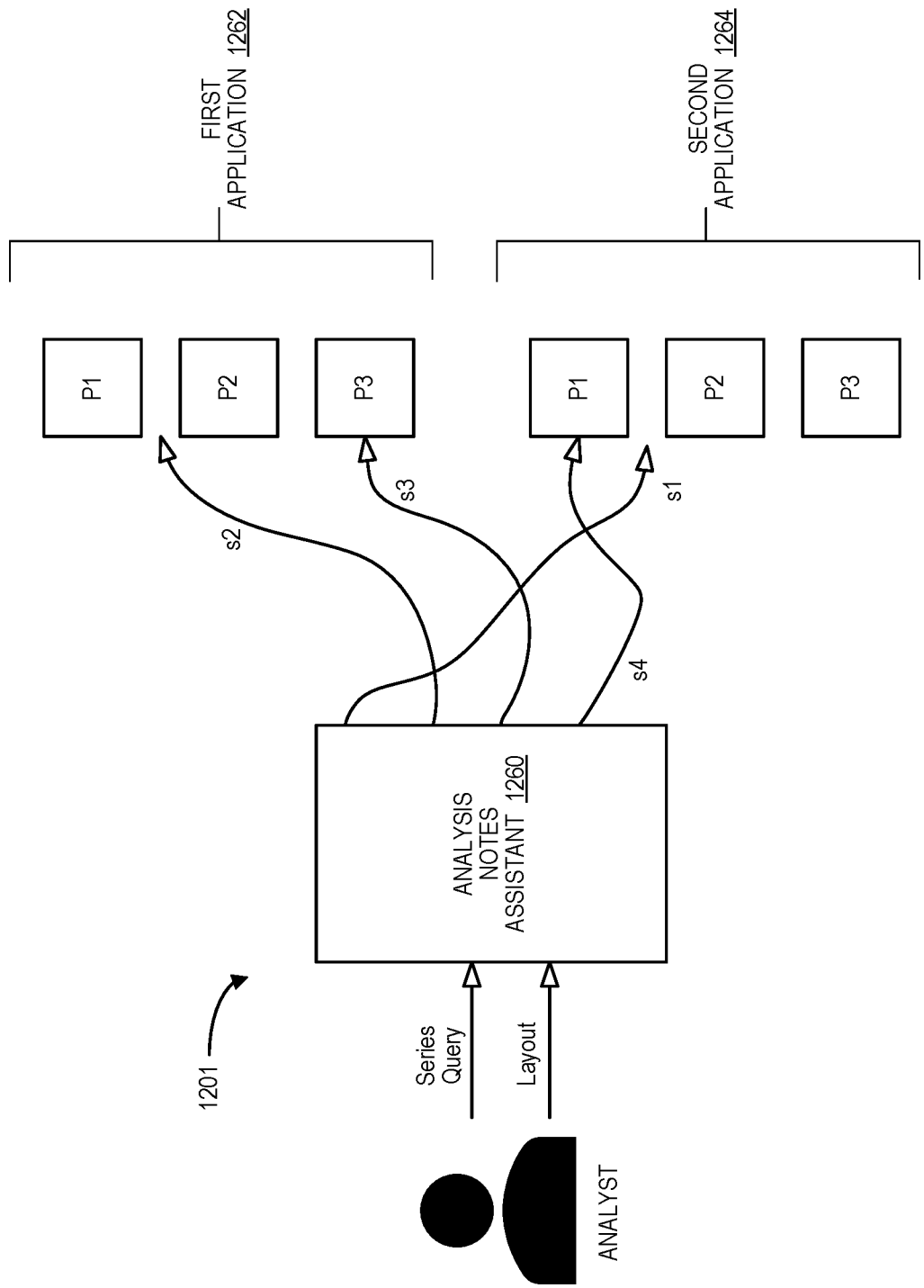

In addition to a single query, some embodiment may allow an analyst to set up a "series" query that is composed of a set of single series queries. For example, FIGS. 12A and 12B are associated with a series query in accordance with some embodiments. In particular, FIG. 12A shows a series query input display 1200 that lets a user select a single icon 1212, a saver series icon 1214, a delete series icon 1216, and a reset icon 1218. The series may be saved with a series name 1220 and an export file. With respect to the series, the display 1200 lets the user select a submit icon 1222 (to run the series query and get the results), an add new row icon 1224 (to add an additional single query to the series), a multi-row edit 1226 (e.g., to change a time period for all of the single queries in a series), and a reset series icon 1228. The series is defined by entering sets of input parameters 1230, each being similar to those described herein with respect to a single query.

Moreover, export options 1240 may define how each single query in a series is to be output (e.g., specifying applications and locations). For example, FIG. 12B illustrates 1201 an analyst entering a series query (e.g., a set of single queries) and layout information into an analysis notes assistant 1260. Initially, the first single query result s1 is automatically sent between pages one and two of a second application 1264 (e.g., a spreadsheet or presentation application). Next, the second single query result s2 is automatically sent between pages one and two of a first application 1262. Subsequently, the third single query result s3 is automatically sent onto page 3 of the first application 1262. Finally, the fourth single query result s4 is automatically sent to page one of the second application 1264. Note that a single query result might be sent to multiple locations (either in the same application or in multiple applications). Although only two applications 1262, 1264 are illustrated in FIG. 12B, embodiments may utilize any number of different applications (e.g., including graphical applications, video application, etc.).

Figure 13:
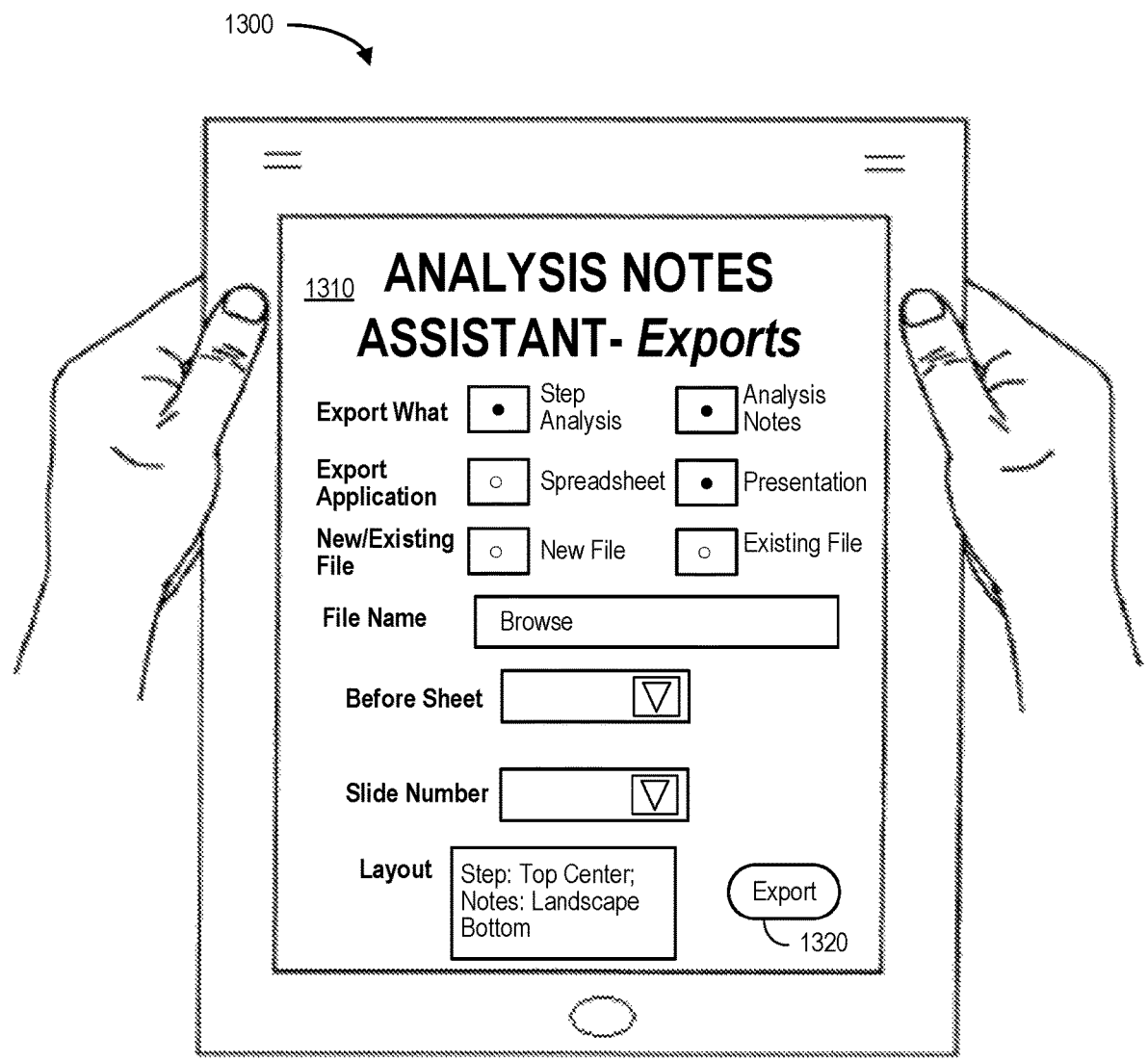
FIG. 13 illustrates a tablet computer with an analysis notes assistant display according to some embodiments.

Note that the displays and devices illustrated herein are only provided as examples, and embodiments may be associated with any other types of user interfaces. For example, FIG. 13 illustrates a tablet computer 1300 with an analysis notes assistant export display 1310 according to some embodiments. The export display 1310 includes export options that can be modified by a user of the handheld computer 1300 and submitted (e.g., via an export icon 1320) to save the information into a spreadsheet and/or presentation application.

Figure 14:
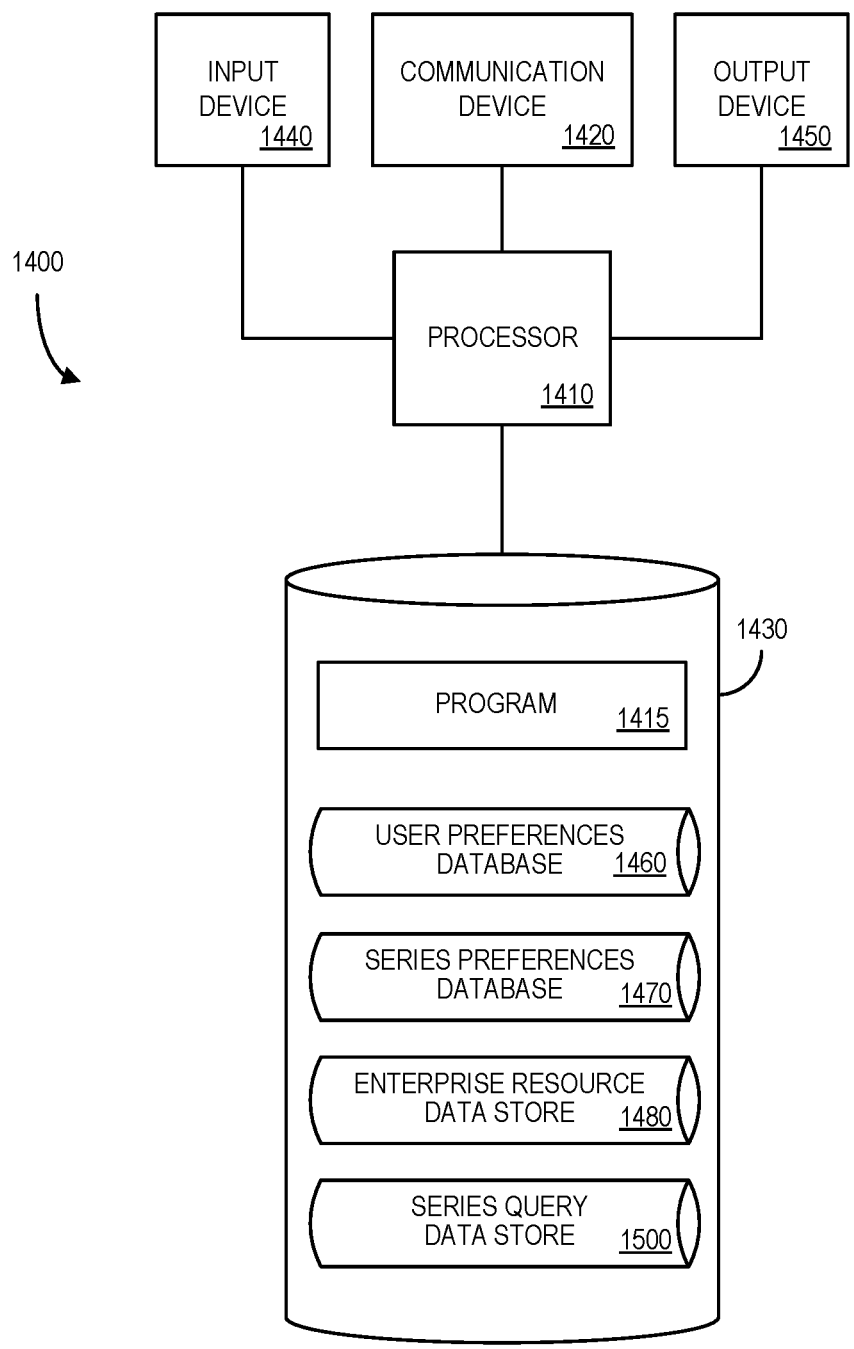
FIG. 14 is a block diagram of an apparatus in accordance with some embodiments of the present invention.

The embodiments described herein may be implemented using any number of different hardware configurations. For example, FIG. 14 illustrates an apparatus 1400 that may be, for example, associated with the system 100 described with respect to FIG. 1. The apparatus 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote third-party information suppliers, analyst computers, and/or communication devices (e.g., PCs and smartphones). Note that communications exchanged via the communication device 1420 may utilize security features, such as those between a public internet user and an internal network of an insurance company and/or an enterprise. The security features might be associated with, for example, web servers, firewalls, and/or PCI infrastructure. The apparatus 1400 further includes an input device 1440 (e.g., a mouse and/or keyboard to enter information about single queries, user preferences, series queries, etc.) and an output device 1450 (e.g., to output reports regarding financial summaries, a step analysis, analysis notes, alerts when a financial threshold is exceeded, etc.).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1415 and/or a network insight risk evaluation tool or application for controlling the processor 1410. The processor 1410 performs instructions of the program 1415, and thereby operates in accordance with any of the embodiments described herein. For example, the processor 1410 may receive, from a remote user device, a selected series query. The processor 1410 may then retrieve from a series query data store 1500, information about a selected set of pre-defined single query parameters including comparison period data. In addition, the processor 1410 may retrieve, from an enterprise resource data store 1480, information about enterprise resource (e.g., financial) entries associated with the selected set and comparison period data. The processor 410 may then arrange to output an indication of step analysis results and analysis notes.

The program 1415 may be stored in a compressed, uncompiled and/or encrypted format. The program 1415 may furthermore include other program elements, such as an operating system, a database management system, and/or device drivers used by the processor 1410 to interface with peripheral devices.

As used herein, information may be "received" by or "transmitted" to, for example: (i) the back-end application computer server 1400 from another device; or (ii) a software application or module within the back-end application computer server 1400 from another software application, module, or any other source.

In some embodiments (such as shown in FIG. 14), the storage device 1430 further stores a user preferences database 1460, a series preferences database 1470, the enterprise resource data store 1480 (e.g., a cube containing Enterprise Resource Planning ("ERP") information), and the series query data store 1500. An example of a database that might be used in connection with the apparatus 1400 will now be described in detail with respect to FIG. 15. Note that the database described herein is only an example, and additional and/or different information may be stored therein. Moreover, various databases might be split or combined in accordance with any of the embodiments described herein. For example, the user preferences database 1460 and/or series preferences database 1470 might be combined and/or linked to each other within the program 1415.

Figure 15:
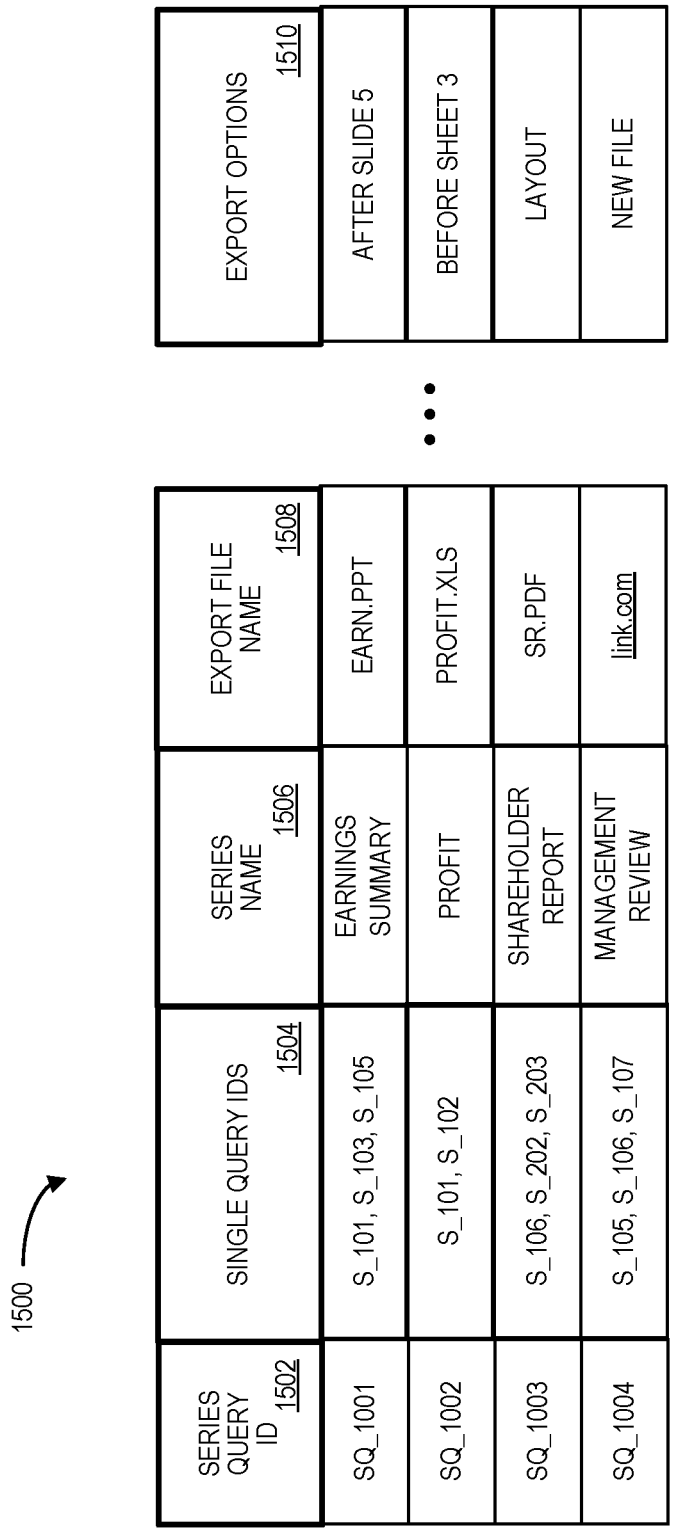
FIG. 15 is a portion of a tabular series query data store according to some embodiments.

Referring to FIG. 15, a table is shown that represents the series query data store 1500 that may be stored at the apparatus 1500 according to some embodiments. The table may include, for example, entries associated with networks that have been used by employees working remotely for enterprise. The table may also define fields 1502, 1504, 1506, 1508, 1510 for each of the entries. The fields 1502, 1504, 1506, 1508, 1510 may, according to some embodiments, specify: a series query identifier 1502, single query identifiers 1504, a series name 1506, an export file name 1508, and export options 1510. The series query data store 1500 may be created and updated, for example, based on information electronically received from analyst.

The series query identifier 1502 may be, for example, a unique alphanumeric code identifying a series query for an analysis notes assistant. The single query identifiers 1504 identify a set of single queries that together comprise the series query. The series name 1506 may describe the series query and the export file name 1508 may define where and how the series query results should be stored. The export options 1510 might indicate a location in a spreadsheet and/or presentation application, how step analysis and/or analysis notes should be positioned on a page, etc.

Thus, embodiments may provide an automated and efficient way of helping an analyst automatically generate a step analysis and/or analysis notes (e.g., associated with various insurers, lines of business, third parties, etc.) to summarize financial information in a way that provides fast and accurate results. Embodiments may also provide an ability to access and interpret data in a holistic, tactical fashion. According to some embodiments, the system may be agnostic regarding particular web browsers, sources of information, etc. For example, information from multiple sources (e.g., an internal insurance financial database and an external data store) might be blended and combined (with respect to reading and/or writing operations) so as to appear as a single "pool" of information to an analyst at a remote device. Moreover, embodiments may be implemented with a modular, flexible approach such that deployment of a new system for an enterprise might be possible relatively quickly.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance enterprises, embodiments may instead be associated with other types of businesses in additional to and/or instead of those described herein. Similarly, although certain attributes and financial values were described in connection some embodiments herein, other types of attributes and financial values might be used instead.

Many embodiments described herein use GUI displays to create and trigger queries. In some embodiments, however, a user might define a query to be included directly in a spreadsheet application, bypassing the use of a GUI display. For example, instead of defining a spreadsheet cell as containing a "=SUM[ ]" formula, embodiments might use a custom formula such as:

=SINGLE_ANA_QUERY[input1,input2,
input3, . . . ,inputn]

where input1 through inputn define the inputs of the query. In this case, the spreadsheet application will automatically generate and insert step analysis and/or analysis notes results into that cell with out requiring the extra step of utilizing a GUI display.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A query tool system implemented via a back-end application computer server, comprising:
an enterprise resource data store, associated with an encrypted database management system, that contains electronic records, each electronic record representing an enterprise resource entry, and including, for each entry, an electronic record identifier and a set of enterprise values;
a series query data store that contains electronic records, each electronic record representing a series query, and including, for each series query, an electronic record identifier and a set of pre-defined single query parameters;
the back-end application computer server, coupled to the enterprise resource data store and series query data store, including:
a computer processor, and
a computer memory, coupled to the computer processor, storing instructions that when executed by the computer processor cause the back-end application computer server to:
receive, from a remote user device, a selected series query,
retrieve, from the series query data store, information about a selected set of pre-defined single query parameters including comparison period data,
retrieve, from the enterprise resource data store, information about enterprise resource entries associated with the selected set of pre-defined single query parameters and comparison period data, and
arrange to output an indication of step analysis results that suppress immaterial items to reduce information transmitted via a distributed communication network and analysis notes in accordance with user preferences that define suppression settings, including: a dollar amount below which all supporting driver variances will be suppressed, a ratio amount below which all supporting driver variances will be suppressed, and a percentage amount below which all supporting driver variances will be suppressed; and
a communication port coupled to the back-end application computer server to exchange data with remote user devices in support of interactive user interface displays, including the indication of step analysis results and analysis notes, via security features and the distributed communication network, wherein the remote user devices can override suppressed items.

2. The system of claim 1, wherein the comparison period data includes a first category, year, and time and a second category, year, and time.

3. The system of claim 1, wherein the set of pre-defined single query parameters includes: (i) an account input, (ii) a segment input, and (iii) a commodity input.

4. The system of claim 1, wherein the set of pre-defined single query parameters includes: (i) a drill method, (ii) a note level, (iii) a show per share option, and (iv) a show staff option.

5. The system of claim 1, wherein the step analysis or analysis notes may be exported to: (i) a spreadsheet application, and (ii) a presentation application.

6. The system of claim 5, wherein the step analysis or analysis notes may be exported to a particular file, application location, and layout.

7. The system of claim 1, wherein series preferences define a series cube preference, a series dollar preference, a series ratio preference, a series decimal preference, series thresholds, and series suppression rules.

8. A computerized query tool method implemented via a back-end application computer server, comprising:
receiving, by a computer processor of a back-end application computer server from a remote user device, a selected series query;
retrieving, from a series query data store, information about a selected set of pre-defined single query parameters including comparison period data, wherein the series query data store contains electronic records, each electronic record representing a series query, and including, for each series query, an electronic record identifier and a set of pre-defined single query parameters;
retrieving, from an enterprise resource data store associated with an encrypted database management system, information about enterprise resource entries associated with the selected set of pre-defined single query parameters and comparison period data, wherein the enterprise resource data store contains electronic records, each electronic record representing an enterprise resource entry, and including, for each entry, an electronic record identifier and a set of enterprise values; and arranging to output an indication of step analysis results that suppress immaterial items to reduce information transmitted via a distributed communication network and analysis notes in accordance with user preferences that define suppression settings, including: a dollar amount below which all supporting driver variances will be suppressed, a ratio amount below which all supporting driver variances will be suppressed, and a percentage amount below which all supporting driver variances will be suppressed, in support of interactive user interface displays via security features and the distributed communication network, wherein the remote user devices can override suppressed items.

9. The method of claim 8, wherein the comparison period data includes a first category, year, and time and a second category, year, and time.

10. The method of claim 8, wherein the set of pre-defined single query parameters includes: (i) an account input, (ii) a segment input, and (iii) a commodity input.

11. The method of claim 8, wherein the set of pre-defined single query parameters includes: (i) a drill method, (ii) a note level, (iii) a show per share option, and (iv) a show staff option.

12. The method of claim 8, wherein the remote user device can override suppressed items.

13. A non-transitory, computer-readable medium storing instructions, that, when executed by a processor, cause the processor to perform a query tool method implemented via a back-end application computer server, the method comprising:

receiving, by a computer processor of a back-end application computer server from a remote user device, a selected series query;

retrieving, from a series query data store, information about a selected set of pre-defined single query parameters including comparison period data, wherein the series query data store contains electronic records, each electronic record representing a series query, and including, for each series query, an electronic record identifier and a set of pre-defined single query parameters;

retrieving, from an enterprise resource data store associated with an encrypted database management system, information about enterprise resource entries associated with the selected set of pre-defined single query parameters and comparison period data, wherein the enterprise resource data store contains electronic records, each electronic record representing an enterprise resource entry, and including, for each entry, an electronic record identifier and a set of enterprise values; and arranging to output an indication of step analysis results that suppress immaterial items to reduce information transmitted via a distributed communication network and analysis notes in accordance with user preferences that define suppression settings, including: a dollar amount below which all supporting driver variances will be suppressed, a ratio amount below which all supporting driver variances will be suppressed, and a percentage amount below which all supporting driver variances will be suppressed, in support of interactive user interface displays via security features and the distributed communication network, wherein the remote user devices can override suppressed items.

14. The medium of claim 13, wherein the step analysis or analysis notes may be exported to: (i) a spreadsheet application, and (ii) a presentation application.

15. The medium of claim 14, wherein the step analysis or analysis notes may be exported to a particular file, application location, and layout.

16. The medium of claim 13, wherein series preferences define a series cube preference, a series dollar preference, a series ratio preference, a series decimal preference, series thresholds, and series suppression rules.

* * * * *